United States Patent [19]

Ong

[11] 4,389,988
[45] Jun. 28, 1983

[54] INTAKE PORT FOR AN INTERNAL COMBUSTION ENGINE

[76] Inventor: Siak H. Ong, 2210 Wilshire Blvd., #577, Santa Monica, Calif. 90403

[21] Appl. No.: 251,289

[22] Filed: Apr. 6, 1981

[51] Int. Cl.³ .............................................. F02B 31/00
[52] U.S. Cl. ................................ 123/306; 123/188 M
[58] Field of Search ................. 123/262, 188 M, 306, 123/309, 308

[56] References Cited

U.S. PATENT DOCUMENTS 2,100,143 11/1937 Mock ............................. 123/262 X
4,137,886 2/1979 Hiramatsu ...................... 123/188 M

FOREIGN PATENT DOCUMENTS 52-64512 5/1977 Japan .............................. 123/188 M Primary Examiner—Tony M. Argenbright
Attorney, Agent, or Firm—Holman & Stern

[57] ABSTRACT

An intake port for an internal combustion engine comprises a plurality of vanes or fins provided at the rim of the inlet opening, or adjacent the inlet valve seat, for dividing and guiding the flow of fuel-air mixture into the combustion chamber in two counter-rotating swirls for optimum mixing just prior to combustion. The fins are divided into groups which direct the flows substantially oppositely into the combustion chamber and each said group is subdivided into groups of fins which further direct the flow from each group into different patterns which combine to produce the counter-rotating swirls.

5 Claims, 3 Drawing Figures

INTAKE PORT FOR AN INTERNAL COMBUSTION ENGINE

BACKGROUND OF THE INVENTION

1. Field of the Invention

The present invention relates to a gasoline engine, especially to an engine having an intake port generating twin swirls for its air-fuel mixture in order to generate higher power output and higher torque.

2. Description of the Prior Art

It is well known that a gasoline engine, which generates a suitable swirl for its air-fuel mixture in the combustion chamber, can result in increased power and torque performance. If a complex swirl for the mixture is generated, this will further increase the efficiency of the engine. It is known that an intake port can generate only a uni-swirl and it is impossible to generate a multiple swirl unless a multiple intake port is provided. Consequently, for a four-stroke internal combustion engine, this will make the structure more complicated and increase the manufacturing costs.

BRIEF SUMMARY OF THE INVENTION

The present invention makes the formation of twin-intake swirls of the air-fuel mixture by a single intake port engine possible, consequently increasing its performance.

BRIEF DESCRIPTION OF THE DRAWINGS

The present invention will now be described in greater detail with reference to the accompanying drawings wherein.

DETAILED DESCRIPTION

Figure 1:
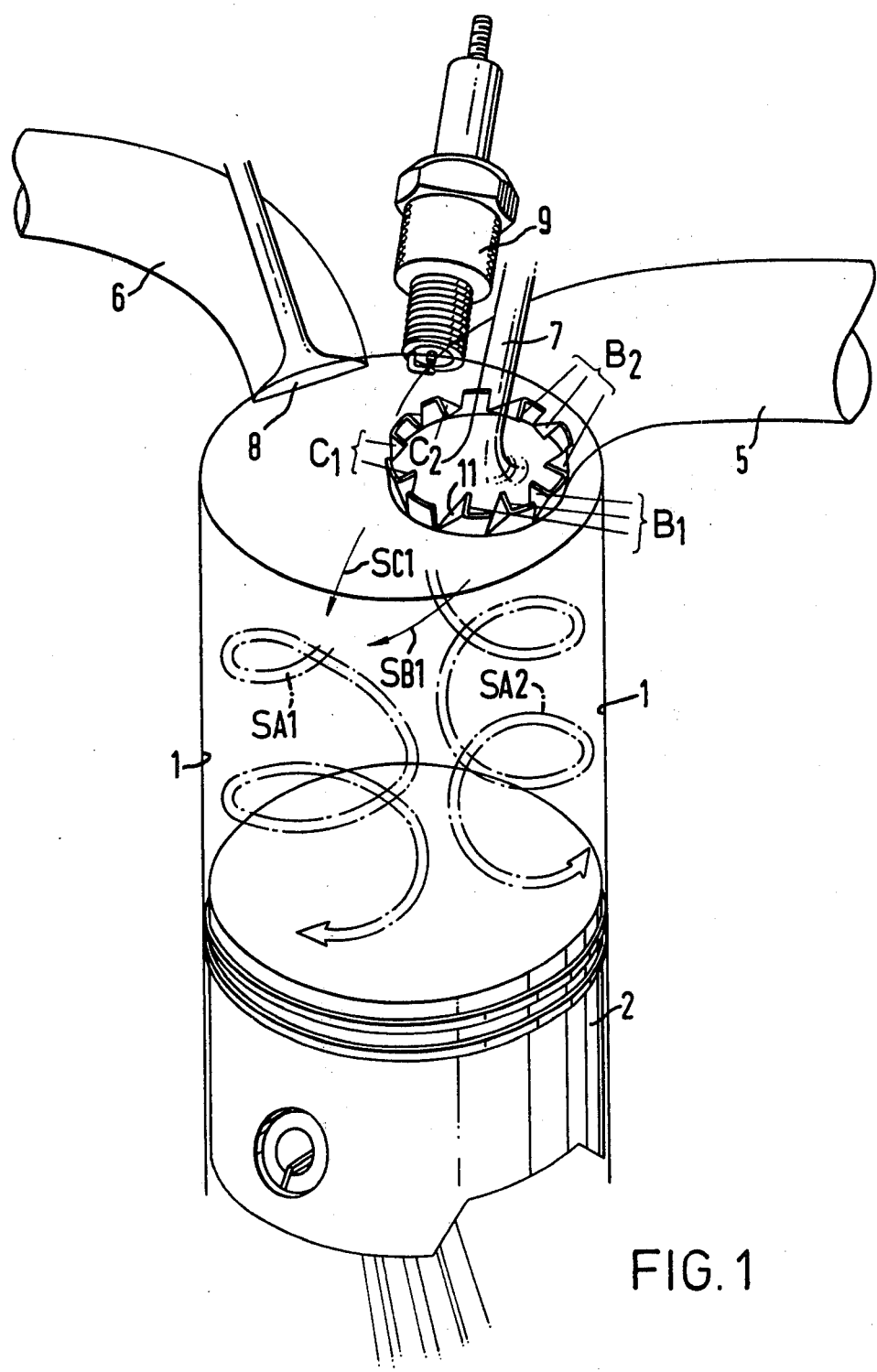
FIG. 1 is a schematic perspective view showing one embodiment of the present invention as used in a four-stroke gasoline engine.
Figure 2:
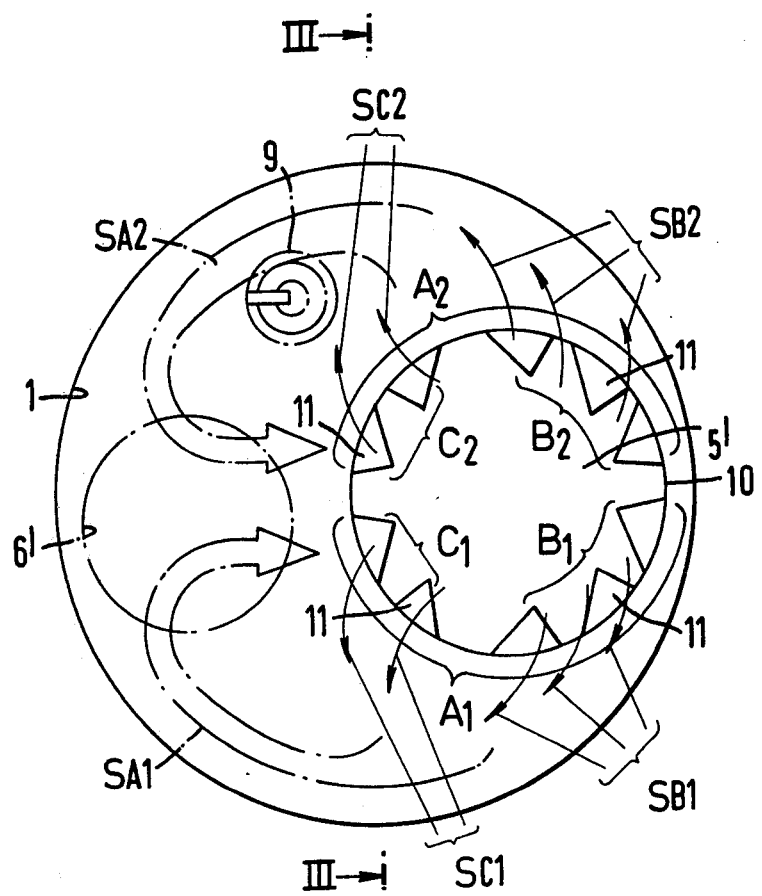
FIG. 2 is a schematic top plan view of the embodiment of the invention shown in FIG. 1.
Figure 3:
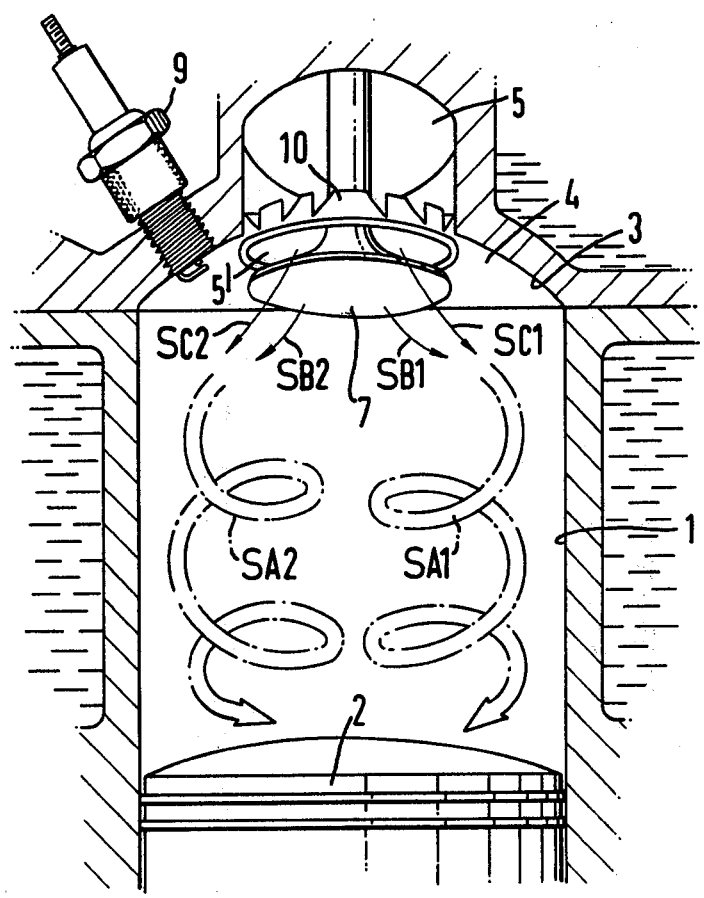
FIG. 3 is a cross-sectional view through an engine utilizing the invention taken generally along line III—III of FIG. 2.

In accordance with the embodiment of the invention illustrated in the drawings, piston 2 moves in the cylinder 1 forming the combustion chamber 4 1 together with the cylinder head 3. The intake port 5 is formed in the cylinder head 3, which also includes the exhaust port, the intake valve 6, 7 and 8, the exhaust valve and the spark plug (9). Intake (5') is the opening of the intake port (5) at the combustion chamber (4). It is at this opening that the basic swirl generating device (10) of the present invention is installed.

The swirl generating device 10 can be cast with the intake port (5), or can be formed as a firing member by pressing out of metalic material in which case, the guiding fins (11) are integrally formed with the ring of the swirl generating device (10). Said guiding fins can be divided into two groups that will guide and effect the air-fuel mixture flow in two opposite directions as shown in FIG. 1. Guiding fins (11) are divided into group $A_1$ and $A_2$. Each group consists of five guiding fins (11) having the intake center as its border. Each of group $A_1$ and $A_2$ has the opposite guiding fins (11) thereof divided into groups $B_1$, $C_1$, and $B_2$, $C_2$.

The operation of the invention will now be described with respect to its embodiment in a gasoline engine as described above. During the intake stroke with the descending of piston 2 as shown, air-fuel mixture enters the combustion chamber through intake part 5. At this moment, the swirl generating device (10) attached at the intake port (5) with its guiding fins (11) form the following swirls for the air-fuel mixture. Each group $A_1$ and $A_2$ has guiding fins $B_1$ and $B_2$ forming the flow of mixture as shown by arrows $SB_1$ and $SB_2$ respectively, flowing from the intake port along the cylinder wall in a counter-rotating manner, and guiding fins $C_1$ and $C_2$ form flows $SC_1$ and $SC_2$ combining with previous flows $SB_1$ and $SB_2$, respectively, in such a way that each group of the guiding fins (11) generating flows $SB_1$, $SC_1$ and $SB_2$, $SC_2$ form in the cylinder two combination counter-rotating swirls $SA_1$ and $SA_2$ respectively. At the end of the compression stroke, piston (2) compresses the air-fuel mixture and spark plug (9) ignites and burns the air-fuel mixture transforming it into energy and driving the piston to descend. Although the explanation of the present invention is based on gasoline engines, the same principle is applicable to any reciprocating piston engine and any rotary engine.

The present invention, as described above, has an intake port generating two streams of swirls. It is simple structurally and provides a great improvement in combustion efficiency.

I claim:

1. An intake port for an internal combustion engine having a cylinder, a piston reciprocally operating therein to form a combustion chamber, an exhaust port for the combustion chamber, an exhaust valve and seat operably mounted in the exhaust port, an inlet port delivering a fuel air mixture to the combustion chamber, an inlet valve and seat operatively mounted in the inlet port, and a spark plug for igniting the fuel-air mixture in the combustion chamber, comprising a plurality of fins disposed in the intake port for controlling the flow of fuel-air mixture into the combustion chamber, said fins being formed into a plurality of groups each of which directs the flow of fuel-air mixture in substantially opposite directions with respect to the other as it enters the combustion chamber to thereby produce counter-rotating swirls of fuel-air mixture within the combustion chamber at least during the intake cycle of the engine.

2. An intake port as claimed in claim 1 wherein said fins are positioned adjacent the inlet valve seat and project from the circumference of the intake port toward the center thereof, and said groups of fins comprise two groups which direct the fuel-air mixture entering the combustion chamber into two counter-rotating swirls.

3. An intake port as claimed in claim 2 wherein each said group of fins comprises two sub-groups of fins, the first subgroup directing said intake flow substantially along the cylinder wall, and the second subgroup directing the flow initially in a counter rotating pattern with respect to said flow from said first subgroup and into said flow from said first subgroup to produce said two counter-rotating swirls.

4. An intake port as claimed in claim 2 wherein each group of fins comprises five fins circumferentially spaced about the central axis of and substantially half of said intake port so that said groups are substantially oppositely positioned with respect to the flows produced thereby.

5. An intake port as claimed in claim 3 wherein said intake port is offset with respect to the center of said cylinder, the fins of each group are circumferentially spaced over substantially half of the circumference of said intake port, said first sub-group of each group comprises three fins positioned on the part of said circumference nearest the adjacent cylinder wall, and said second sub-group of each group comprises two fins positioned on the part of said circumference nearest the center of said intake port.

* * * * *